(12) United States Patent
Fukuhara et al.

(10) Patent No.: US 7,802,713 B2
(45) Date of Patent: Sep. 28, 2010

(54) FRICTION STIR SPOT JOINING DEVICE

(75) Inventors: Kazumi Fukuhara, Akashi (JP); Masaki Kumagai, Tokyo (JP); Toshihiko Fukuda, Tokyo (JP); Yoshio Sato, Ayase (JP); Kenta Aoki, Ayase (JP)

(73) Assignees: Kawasaki Jukogyo Kabushiki Kaisha, Kobe-Shi, Hyogo (JP); Sumitomo Light Metal Industries, Ltd., Tokyo (JP)

( * ) Notice: Subject to any disclaimer, the term of this patent is extended or adjusted under 35 U.S.C. 154(b) by 0 days.

(21) Appl. No.: 12/317,258

(22) Filed: Dec. 19, 2008

(65) Prior Publication Data
US 2009/0159639 A1   Jun. 25, 2009

(30) Foreign Application Priority Data
Dec. 21, 2007   (JP) .............................. 2007-329490

(51) Int. Cl.
*B23K 20/12* (2006.01)
(52) U.S. Cl. ..................................... 228/2.1; 228/112.1
(58) Field of Classification Search .............. 228/112.1, 228/2.1
See application file for complete search history.

(56) References Cited
U.S. PATENT DOCUMENTS
6,832,713 B2 * 12/2004 Kano et al. .................. 228/2.1
7,370,784 B2 * 5/2008 Nagao ......................... 228/2.1
2003/0029903 A1 * 2/2003 Kashiki et al. ........... 228/112.1
2004/0079787 A1   4/2004 Okamoto et al.

FOREIGN PATENT DOCUMENTS
EP          1 437 193        7/2004
JP          2002-035960      2/2002
JP          2007-216249    * 8/2007

* cited by examiner

*Primary Examiner*—Roy King
*Assistant Examiner*—Michael Aboagye
(74) *Attorney, Agent, or Firm*—Flynn, Thiel, Boutell & Tanis, P.C.

(57) ABSTRACT

There is provided a friction stir spot joining device wherein stirring-related members are unitized to form a unitized stirring unit and an opening is formed in a friction stir spot joining device body for housing the unitized stirring unit therein. A stirring motor, a stirring shaft and a power transmission mechanism are unitized to form a stirring unit, and bearings of a linear motion guide are fixed to the stirring unit immediately under the stirring unit, and a ball nut is fixed to the back face of the stirring unit, wherein the friction stir spot joining device body is opened to form the opening at a rear upper portion through which the stirring unit is caused to move inside thereof.

2 Claims, 3 Drawing Sheets

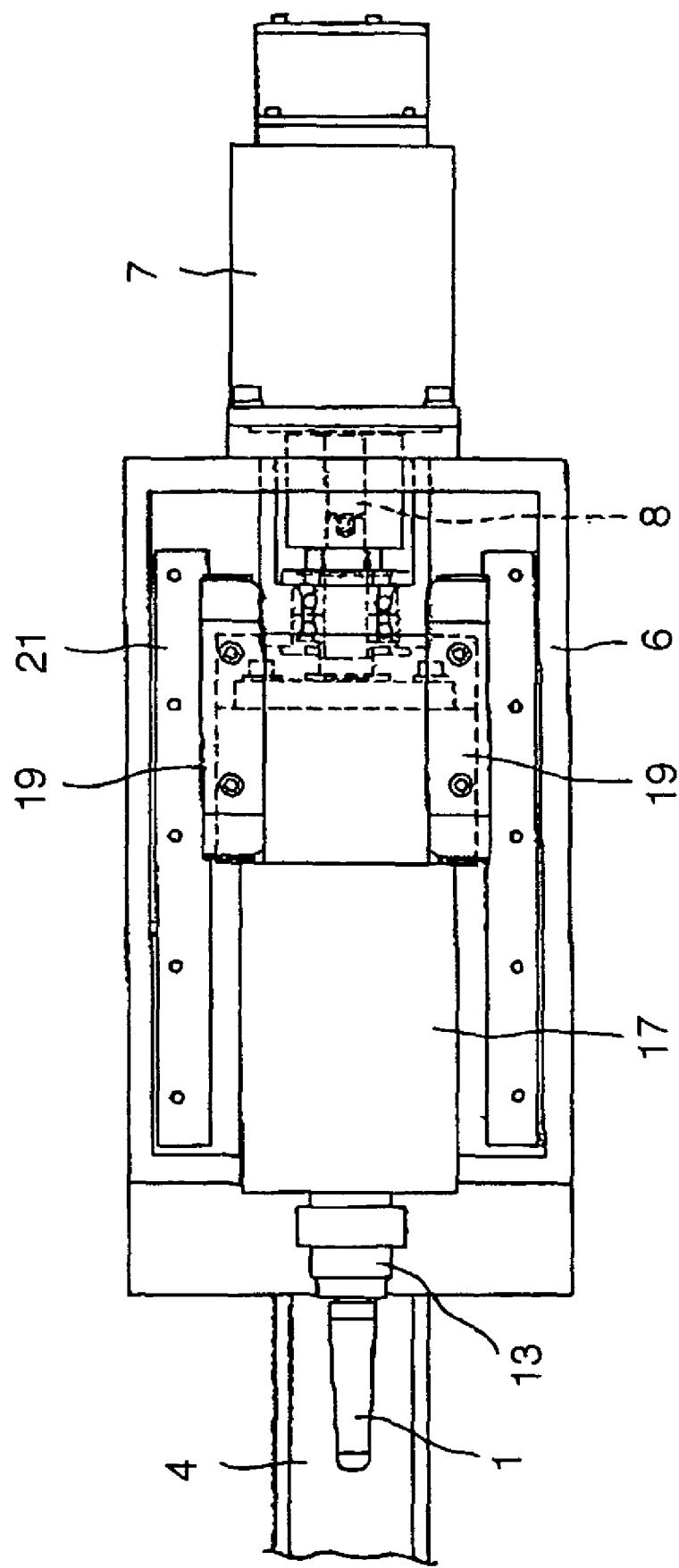

FRICTION STIR SPOT JOINING DEVICE

FIELD OF THE INVENTION

The invention relates a friction stir spot joining device for softening and stirring an object to be joined by frictional heat generated by rotation of a pin so as to perform spot joining, and provided with a stirring motor for rotating the pin and a pressure application motor for driving the pin to be moved straight.

BACKGROUND OF THE INVENTION

There has been conventionally a friction stir spot joining device for softening and stirring an object to be joined by frictional heat generated by rotation of a pin so as to perform spot joining, and provided with a stirring motor for rotating the pin and a pressure application motor for driving the pin to be moved straight (for example, see Patent Document 1).

There has been also a friction stir spot joining device for softening and stirring an object to be joined by frictional heat generated by rotation of a center pin and a shoulder pin so as to perform spot joining, and provided with a stirring motor for rotating the shoulder pin in which the center pin is inserted, a motor for driving the center pin for causing the center pin alone to be retracted, and a pressure application motor, wherein a shaft of the shoulder pin and the stirring motor are connected to each other by a power transmission mechanism, and a shaft of the center pin and the motor for driving the center pin are connected to each other by another power transmission mechanism so as to integrate stirring-related members, and bearings of a linear motion guide are fixed to a lower portion of the power transmission mechanism for the center pin behind thereof, a ball nut is fixed to the back face of the integrated stirring-related members, and the pressure application motor is fixed to a friction stir spot joining device body to which rails of the linear motion guide are fixed and which contains therein the integrated stirring-related members, and wherein the screw shaft connected to the pressure application motor is caused to screw with the ball nut so as to advance or retract the integrated stirring-related members (for example, see Patent Document 2).

Patent Document 1 JP 2002-35960A
Patent Document 2 JP 2007-216249A

According to the friction stir spot joining device described in Patent Document 1, since the stirring motor for rotating the pin is fixed to the friction stir spot joining device body side like the pressure application motor, when the pin is driven so as to be moved straight, there occurs a phase difference in a positional relation between the stirring motor and the pin, so that a spline mechanism is adopted for transmitting the rotary motion of the stirring motor to the pin. Owing to the spline mechanism, a straight moving stroke of the pin is restricted by the length of a groove of the spline and there is a possibility that the entire friction stir spot joining device is large sized.

According to the friction stir spot joining device described in Patent Document 2, since it adopts a configuration wherein the stirring-related members are integrated, and the pin and the stirring motor are moved at the same time inside the friction stir spot joining device body relative to the pressure application motor fixed to the friction stir spot joining device body side, the problem of Patent Document 1 is tentatively solved by the configuration of the friction stir spot joining device disclosed in Patent Document 2. However, since the integrated stirring-related members are entirely contained in the friction stir spot joining device body, when performing maintenance or assembly of the stirring-related members, the stirring-related members are difficult to take out and assemble, and the stirring motor and the power transmission mechanism for the stirring motor cannot be solely removed or replaced. Further, since the bearings of the linear motion guide are fixed to the lower portion of the power transmission mechanism behind thereof, a large burden is applied to the bearings of the linear motion guide, causing a problem that the pin side is liable to vibrate and so forth.

SUMMARY OF THE INVENTION

The present invention has been made in view of the problems of the foregoing conventional techniques, and it is therefore an object of the invention to provide a friction stir spot joining device which unitizes stirring-related members to form a stirring unit, and forms an opening in a friction stir spot joining device body (hereinafter referred to a joining device body) for housing therein the stirring unit, so that the stirring unit becomes light in weight, has a general versatility with a simple structure and can be moved with assurance, and the components thereof can be removed with ease.

To achieve the above object, a friction stir spot joining device for softening and stirring an object to be joined by frictional heat generated by rotation of a pin 1 so as to perform spot joining, according to the first aspect of the invention, comprises a fixed arm 4; a friction stir spot joining device body 6 connected to the fixed arm 4 and incorporating therein a stirring shaft 13 supported by bearings 11 and having the pin 1 at the tip end and a hole 12 at the center thereof through which a screw shaft 9 can be housed from the rear, a stirring motor 10 for rotating the stirring shaft 13, a power transmission mechanism 14 disposed between the stirring shaft 13 and the stirring motor 10, and provided with rails 21 of a linear motion guide provided at a bottom plate thereof; and a pressure application motor 7 fixed to a rear end of the friction stir spot joining device body 6; wherein the stirring motor 10, the stirring shaft 13 and the power transmission mechanism 14 are unitized to form a stirring unit, and bearings 19 of the linear motion guide are fixed to the stirring unit immediately under the stirring unit, and a ball nut 16 is fixed to the back face of the stirring unit, wherein the friction stir spot joining device body 6 is opened to form an opening at a rear upper portion through which the stirring unit is caused to move inside thereof; and wherein the screw shaft 9 connected to the pressure application motor 7 is caused to screw with the ball nut 16 fixed to the back face of the stirring unit so as to advance or retract the stirring unit by the pressure application motor 7.

The friction stir spot joining device according to the second aspect of the invention is characterized in that the power transmission mechanism 14 comprises a toothed pulley 15 and a toothed belt, and lateral split type bearings 19, 19 of the linear motion guide are disposed immediately under the toothed pulley 15.

With the configuration of the friction stir spot joining device according to the first aspect of the invention, a burden applied to the bearings of the linear motion guide is reduced, thereby restraining the vibration at the pin side, and the components of the stirring unit can be removed and replaced with ease, so that the friction stir spot joining device can be light in weight as a whole.

With the configuration of the friction stir spot joining device according to the second aspect of the invention, the transmission of the power from the stirring motor to the stirring shaft is assured and the linear motion guide can be disposed to approach a portion immediately under the toothed pulley, so that the generation of falling torque relative to the linear motion guide caused by stirring torque is prevented and a distance from the center of the stirring shaft to the bottom face of the joining device body can be minimized, thereby restraining the friction stir spot joining device from increasing in height.

BRIEF DESCRIPTION OF THE DRAWINGS

FIG. 3 is a schematic view as viewed from the arrow B-B in FIG. 1.

PREFERRED EMBODIMENT OF THE INVENTION

Figure 1:
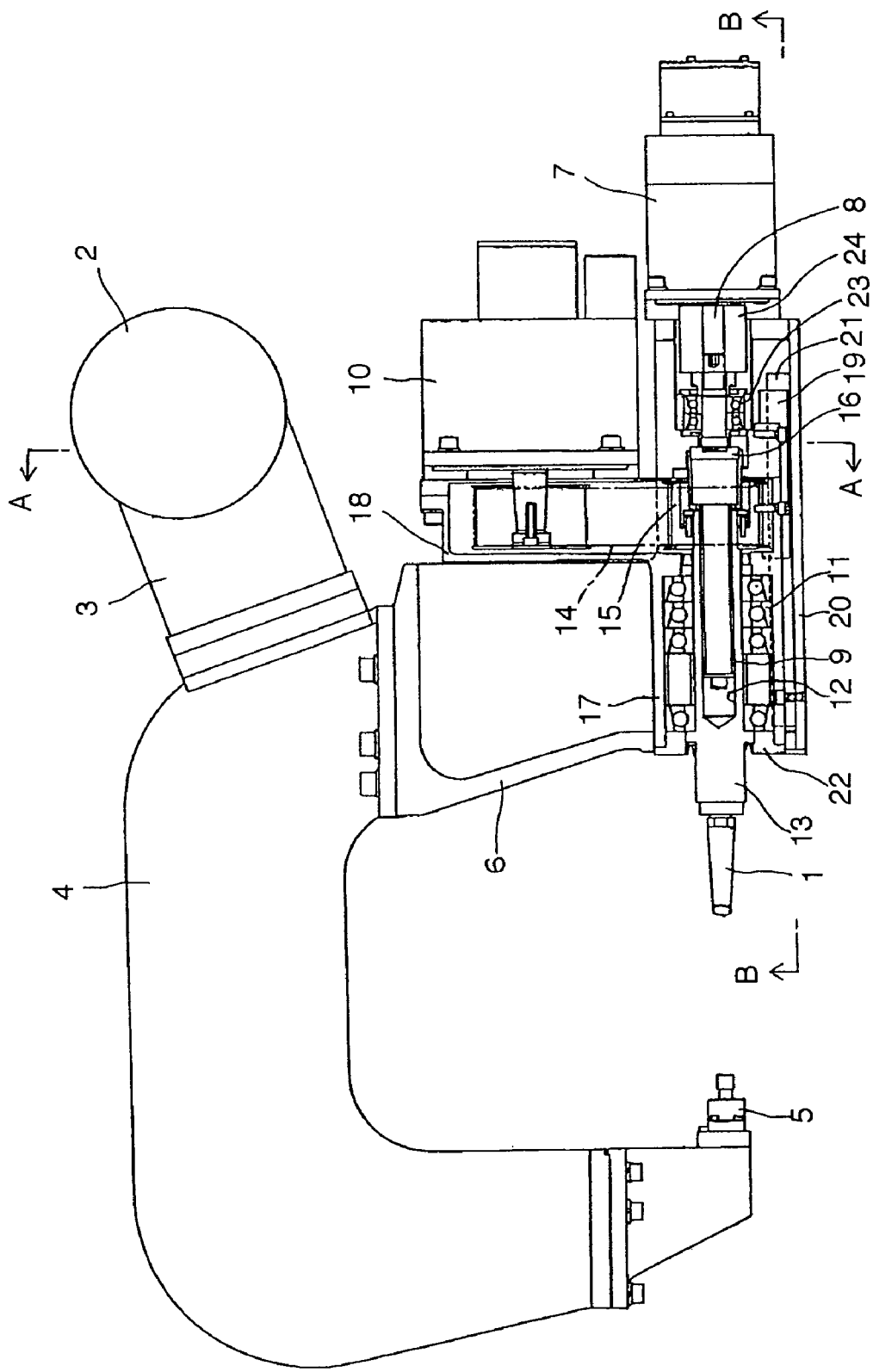
FIG. 1 is a view showing a schematic configuration of a friction stir spot joining device of the invention.
Figure 2:
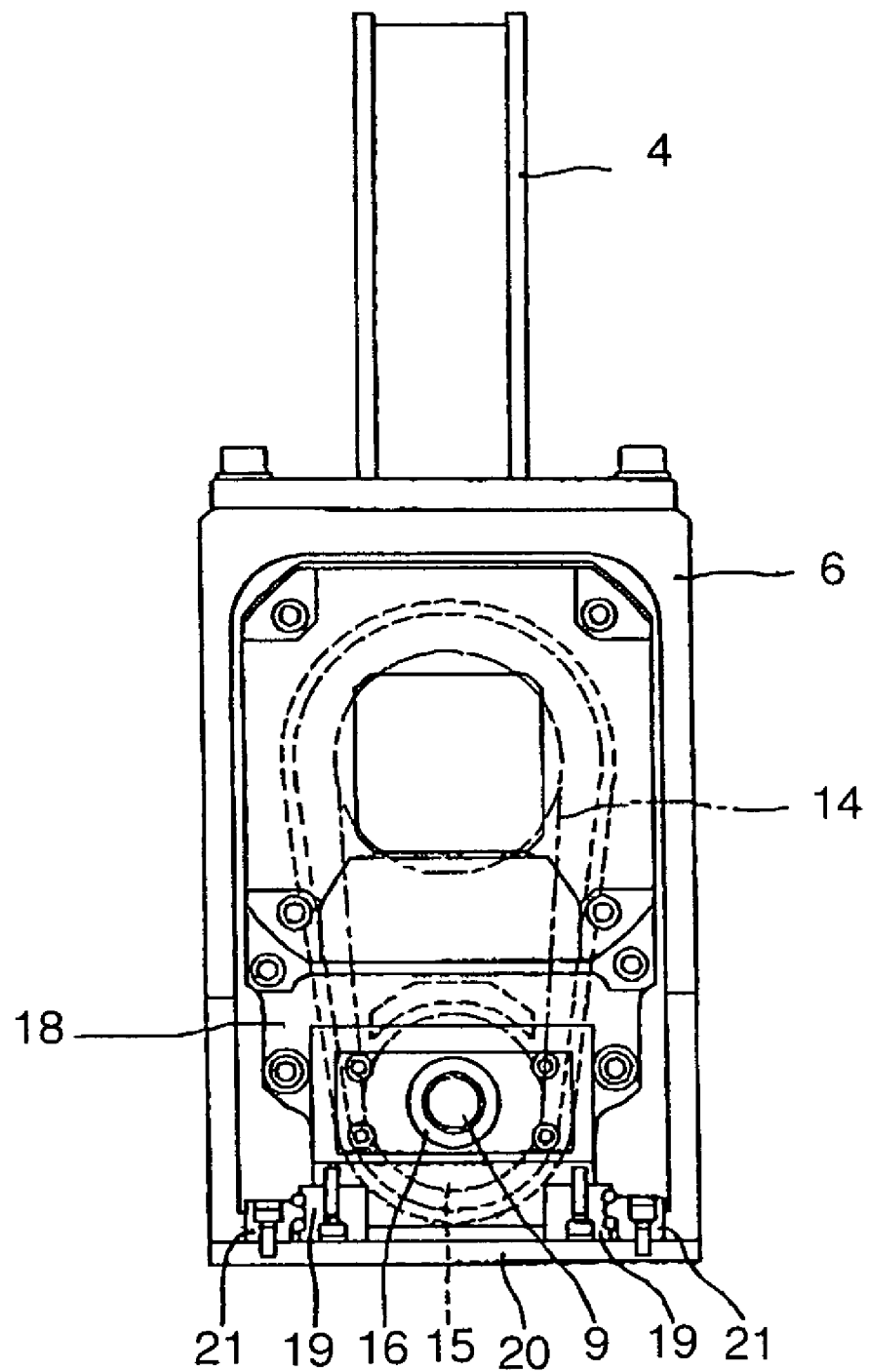
FIG. 2 is a schematic view as viewed from the arrow A-A in FIG. 1.

FIG. 1 is a view showing a schematic configuration of a friction stir spot joining adapted for working the present invention. The friction stir spot joining device, according to the first aspect of the invention, for softening and stirring an object to be joined by frictional heat generated by rotation of a pin so as to perform spot joining, wherein the stirring motor 10, a stirring shaft 13 supported by bearings 11 and having the pin 1 at the tip end and a hole 12 at the center thereof through which a screw shaft 9 can be housed from the rear, and a power transmission mechanism 14 disposed between the stirring motor 10 and the stirring shaft 13 are unitized to form a stirring unit, and bearings 19, 19 of a linear motion guide are fixed to the stirring unit immediately under the stirring unit, a ball nut 16 is fixed to the back face of the stirring unit, and a friction stir spot joining device body to which rails 21 of the linear motion guide are fixed has a rear upper portion being opened through which the stirring unit is caused to move inside thereof, and a rear end thereof to which the pressure application motor 7 is fixed, and wherein the screw shaft screw shaft 9 connected to the pressure application motor 7 is caused to screw with the ball nut 16 fixed to the back face of the stirring unit so as to advance or retract the stirring unit.

In the friction stir spot joining device of the second aspect of the invention, the power transmission mechanism 14 comprises a toothed pulley 15 and a toothed belt, and lateral split type bearings 19, 19 of the linear motion guide are disposed immediately under the toothed pulley 15.

First Example

In the friction stir spot joining device, the pin 1 is inserted in a joining point of an object to be joined (not shown), and a part of the object to be joined is softened and stirred by the frictional heat caused by rotation of the pin 1, thereby performing spot joining. The friction stir spot joining device is roughly structured as follows.

A holding jig 5 for holding the object to be joined is disposed at the tip end of a fixed arm 4 which is fitted to a wrist 2 of a robot by way of a bracket 3, and a joining device body 6 is fixedly secured to a rear end portion of the fixed arm 4. The pressure application motor 7 is fixedly secured to a rear end portion of the joining device body 6 and the screw shaft 9 is fixedly secured to an output shaft 8 of the pressure application motor 7.

The stirring motor 10 for rotating the pin 1, a stirring shaft 13 having the pin 1 at the tip end, and supported by the bearings 11 and provided with the hole 12 at the center through which the screw shaft 9 can be housed from the rear, and the power transmission mechanism 14 comprised of, e.g. a belt and a pulley and disposed between the stirring shaft 13 and the stirring motor 10 are unitized and incorporated in the joining device body 6 as the stirring unit.

The pulley 15 for a belt of the power transmission mechanism 14 is fixedly secured to the rear portion of the stirring shaft 13, and the ball nut 16 is fixedly secured to the opening of the hole 12 coaxially with the hole 2. An upwardly extended support member 18 for supporting the stirring motor 10 is fixedly secured to the rear end portion of a driving unit boy 17 for holding outer rings of the bearings 11 of the stirring shaft 13. The bearings 19, 19 of the linear motion guide are fixedly secured to the lower portion of the driving unit boy 17 immediately under the driving unit boy 17.

Rails 21 for guiding the movement of the bearings 19, 19 of the linear motion guide are provided on a bottom plate 20 of the joining device body 6 for a length exceeding a moving stroke of the bearings 19, 19 of the linear motion guide, and an upper face and both side faces of the joining device body 6 are opened to form an opening so as to cause the stirring motor 10 to be exposed outside. With the stirring motor 10 having the opening so as to be exposed outside, the stirring motor 10 and the power transmission mechanism 14 can be easily taken out from these openings.

Depicted by 22 is a pressure ring for pressing the front part of the outer rings of the bearings 11. Depicted by 23 is bearings disposed at the rear portion of the screw shaft 9 and journaling the screw shaft 9. Depicted by 24 is a coupling for connecting between the output shaft 8 of the pressure application motor 7 and the screw shaft 9.

With the friction stir spot joining device having the foregoing configuration, the entire friction stir spot joining device is first moved by the robot 2 to a position opposing an intended joining point of the object to be joined.

The stirring motor 10 and the pressure application motor 7 are driven at the position opposing the intended joining point, thereby causing the ball nut 16 to advance by the pressure application motor 7, so that the driving unit boy 17 is guided by the linear motion guide to advance toward the intended joining point while accompanied with the stirring motor 10, and the pin 1 is rotated together with the stirring shaft 13 by the stirring motor 10.

The pin 1 is caused to pass through the surface of the object to be joined and inserted therein by the pressure application motor 7 and it is rendered in a state of rotation at the joining point of the object to be joined. At this point in time, the driving of pressure application motor 7 is stopped to stop the advance of the pin 1. However, the pin 1 frictions the object to be joined by rotation of the pin 1 to dissolve a part of the object to be joined and stir and stir the dissolved matter, and the dissolved matter performs a spot joining of the object to be joined.

Upon completion of the foregoing joining operation, the pressure application motor 7 is inversely rotated. With the inverse rotation of the pressure application motor 7, the pin 1 continues its rotation to stir the object to be joined and is taken out from the joining point of the object to be joined.

When the pressure application motor 7 is inversely driven by the inverse rotation, the driving unit boy 17 is guided by the linear motion guide while accompanied with the stirring motor 10, and is retracted from the joining point side of the object to be joined, and is returned to a state prior to the joining operation.

As mentioned in detail above, with the friction stir spot joining device of the present invention, since the stirring motor 10 is moved together with the driving unit boy 17, there is no obstacle in the power transmission from the stirring motor 10 to the stirring shaft 13. Further, since the stirring motor 10, the stirring shaft 13 supported by bearings 11 and having the pin 1 at the tip end and the hole 12 through which the screw shaft 9 can be housed from the rear portion thereof, and the power transmission mechanism 14 are unitized to form the stirring unit, and bearings 19, 19 of linear motion guide are fixed to the stirring unit immediately under the stirring unit, the stirring unit has a general versatility with a simple structure, and it can be moved while guided by the linear motion guide with assurance. Further, since the joining device body has the opening at the rear upper portion for causing the stirring unit to be moved therein, the components of the stirring unit are removable and replaceable with ease, and the friction stir spot joining device becomes light in weight as a whole.

Second Example

The power transmission mechanism 14 according to the first example is configured to be comprised of a toothed pulley 15 and a toothed belt, and lateral split type bearings 19, 19 of a linear motion guide are disposed immediately under the toothed pulley 15.

As a result, power transmission from a stirring motor 10 to a stirring shaft 13 is performed with assurance, and the linear motion guide can be disposed at a portion closer than a portion immediately under the toothed pulley 15, so that falling torque relative to the linear motion guide caused by stirring torque is not generated. Further, it is possible to minimize a distance from the center of the stirring shaft 13 to a bottom plate 20 of a joining device body 6.

What is claimed is:

1. A friction stir spot joining device for softening and stirring an object to be joined by spot joining through frictional heat generated by rotation of a pin, said friction stir spot joining device comprising: a fixed arm; a friction stir spot joining device body connected to the fixed arm and having incorporated therein a stirring shaft supported by bearings and having the pin at a tip end and a hole at the center thereof through which a screw shaft is housed from the rear, a stirring motor for rotating the stirring shaft, a power transmission mechanism disposed between the stirring shaft and the stirring motor and rails of a linear motion guide provided at a bottom plate thereof; and a pressure application motor fixed to a rear end of the friction stir spot joining device body;

characterized in that the stirring motor, the stirring shaft and the power transmission mechanism are unitized to form a stirring unit, bearings of the linear motion guide are fixed to the stirring unit at a position immediately beneath the power transmission mechanism, a ball nut is fixed to a back face of the stirring unit, the friction stir spot joining device body is opened to form an opening at a rear upper portion thereof through which the stirring unit is caused to move inside thereof so that the stirring motor is exposed to the outside through the opening and the screw shaft connected to the pressure application motor is caused to screw with the ball nut fixed to the back face of the stirring unit so as to advance or retract the stirring unit by the pressure application motor.

2. The friction stir spot joining device according to claim 1, wherein the power transmission mechanism comprises a toothed pulley and a toothed belt and the linear motion guide has lateral split bearings disposed immediately underneath the toothed pulley.

\* \* \* \* \*